Aug. 12, 1930.　　　F. N. GUYMON　　　1,773,039
WATER TROUGH
Filed April 6, 1929　　　2 Sheets-Sheet 1

Franklin Noah Guymon
INVENTOR
BY Victor J. Evans
ATTORNEY

Aug. 12, 1930.  F. N. GUYMON  1,773,039
WATER TROUGH
Filed April 6, 1929   2 Sheets-Sheet 2
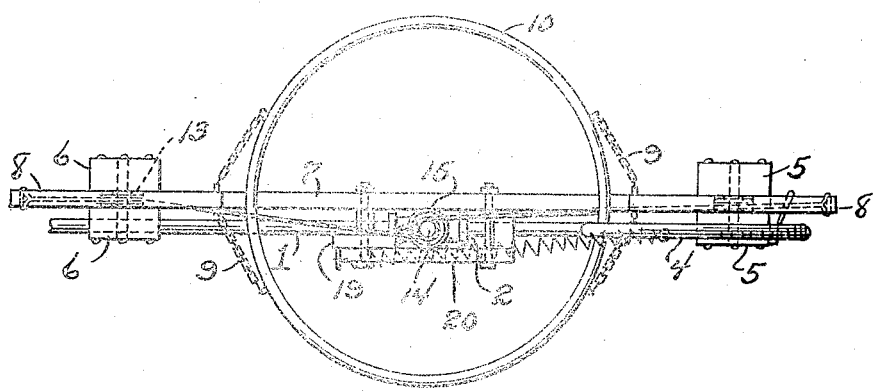
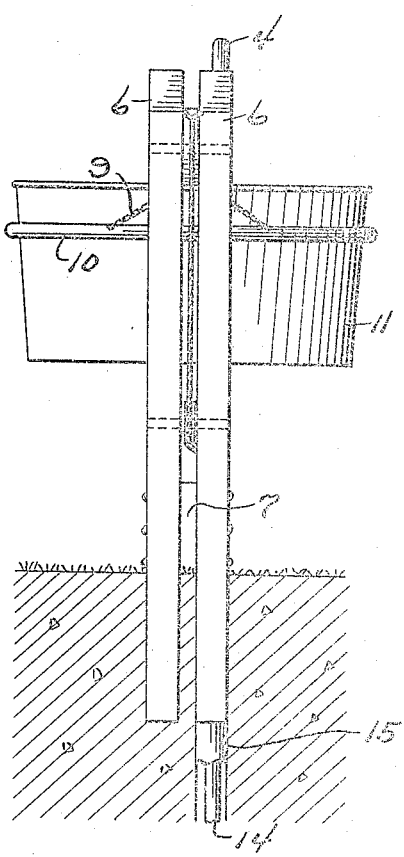
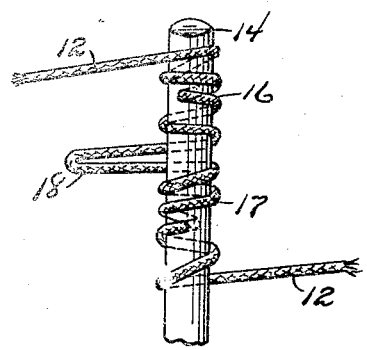
Franklin Noah Guymon
INVENTOR
BY Victor J. Evans
ATTORNEY Patented Aug. 12, 1930

1,773,039

UNITED STATES PATENT OFFICE

FRANKLIN NOAH GUYMON, OF HUNTINGTON, UTAH

WATER TROUGH

Application filed April 6, 1929. Serial No. 353,097.

The object of this, my present invention, is the provision of a watering trough for stock that includes a water containing tub supported in a manner whereby the same will automatically open a valve to deliver water thereinto when the water in the tub has decreased to a determined extent and thereafter automatically open the valve to again deliver water into the trough and to quickly close the valve when a sufficient quantity of water has been received in the said trough.

To the attainment of the foregoing and other objects which will present themselves as the nature of the invention is better understood, the improvement also resides in certain other novel features of construction, combination and operative association of parts, satisfactory embodiments of which are disclosed by the accompanying drawings.

In the drawings:

Figure 2 is a top plan view thereof.

Figure 3 is an end view thereof.

Figure 4 is a perspective view to illustrate the manner in which the cable is wound around the valve stem.

Figure 5:
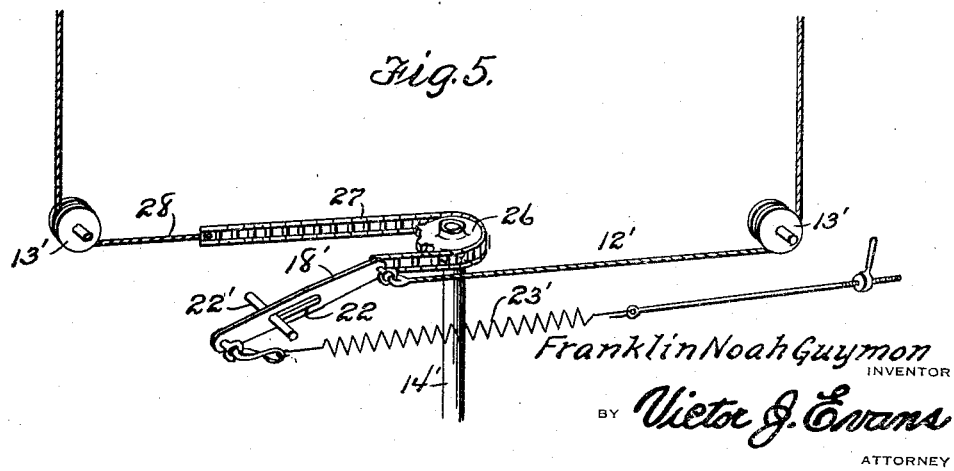

Figure 5 is a fragmentary perspective view to illustrate a modification.

As disclosed by the drawings there is buried in the ground, below the frost level, a water conducting pipe 1, which has its passage controlled by a valve 2. One end of the pipe has a vertical branch 3 which extends a suitable distance above the ground surface and which terminates in a round portion or goose neck 4.

Firmly embedded in the ground, at equidistantly spaced points, there are pairs of spaced uprights 5—5 and 6—6, respectively.
The pairs of uprights are held in spaced relation by suitable spacer elements, one of which includes a beam 7 that rests on the ground surface.

Between each pair of beams 5—5 and 6—6, adjacent to the top thereof and below the goose neck outlet for the water conducting pipe there are approximately centrally pivoted levers 8, respectively, the inner or confronting ends of these levers having flexible elements, such as chains 9 attached thereto and these chains in turn are secured to a ring 10 that supports therein a tub 11. The outer end of each of the levers 8—8 has secured thereto a flexible element such as a strong cable or chain 12 and these elements 12 are trained around grooved wheels 13 that have their shafts journaled in suitable bearings in the spaced uprights 5 and 6.

The valve 2 has an operating stem 14 which is vertically directed and is guided through a tube 15 which, for the major portion of its length, is embedded in the earth. The flexible element 12 has its lower portions or leads directed inwardly from the grooved or sheave wheels 13, and these portions of the said element 12 are wound around the upper end of the valve stem 14 which projects above the tubular guide or casing 15. The central portion of the flexible element, between the coil portions 16 and 17 thereof, which are wound around the valve stem 14 terminates in a loop 18 and this loop passes through an eye or opening in one end of a lever 19.

A suitable brace element 20 for the guide tube 15 is secured on the board or beam 7, and passing through this element, adjacent to one end thereof, there is a pivot 21 which also passes through an elongated opening 22 arranged longitudinally in the center of the lever 19. The outer end of the lever has connected thereto one end of a coil spring 23, the second end of the spring being secured to the eye end of a bolt 24 which is suitably guided through the uprights 5, and the outer end of the bolt is engaged by a winged or handle carrying nut 25.

Figure 1:
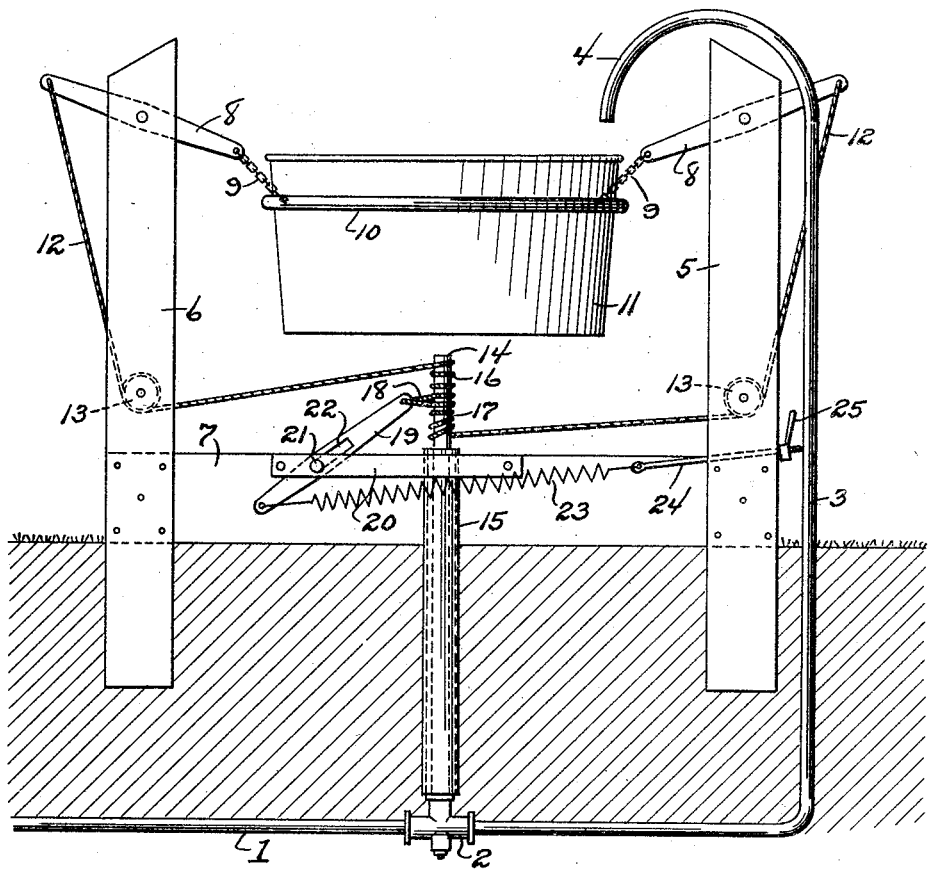
Figure 1 is a side elevation of the improvement.

It is to be noted that there is considerable play between the lever 19 and the pivotal support 21 therefor. This permits of a longitudinal movement of the said lever and a quick turning of the valve stem 14 and consequently a snapping action and the closing of the valve 2, so that only a desired quantity of water can be delivered from the pipe 1 into the tub 11. As the water in the tub decreases the tub will rise, causing the spring 23 to exert a pull upon the lever 19. This pull will first pull the lever to bring the pivot pin 21 from the end wall provided by the slot 22, contacted by the said pivot in the showing of Figure 1 of the drawings to engagement with the second end of the slot, thus shortening the end of the lever connected to the looped portion 18 of the flexible element 12 and thereby adding to the tensional strength of the spring 23 to permit of the same swinging the lever to open the valve. Of course, as an additional supply of water is delivered into the tub the parts will be reversed, that is, the weight of the tub and the actuation of the elements connected therewith will expand the spring, causing the lever 19 to be moved to contact with the end wall of the slot 22 and permit of the cables turning the valve stem to quickly close the valve.

In Figure 5 I have illustrated a slight modification in which the valve stem 14' has fixed thereon a sprocket wheel 26. This sprocket wheel has trained thereover a comparatively short sprocket chain 27. One end of the sprocket chain 27 is connected to a lever 18' similar to the lever 19 and this end is also connected to one of the lower leads 12' of a flexible element similar to the flexible element 12. The second end of the chain has secured thereto the end of the lower portion or lead of a second cable 28. Both of the cables 12' and 28 are trained around grooved or sheave wheels 13' similar to those previously described and the flexible elements 12' and 28 are connected to tub supporting levers similar to the levers 8. The operation of this construction is similar to that previously described, the lever 18' being provided with the elongated slot 22' for the pivot 22, and the lower end of the lever being connected with the adjustable spring 23', which is similar to the spring 23.

The construction and advantages of my improvement will be readily apparent to those skilled in the art to which such invention relates so that further detailed description will not be required. It is thought necessary to add, however, that I do not wish to be restricted to the precise details herein set forth and, therefore, hold myself entitled to make such changes therefrom as fairly fall within the scope of what I claim.

Having described the invention, I claim:

1. In a watering trough, a water conducting pipe having its passage controlled by a valve and having an angle branch merging into a goose neck outlet, fixed standards, centrally pivoted levers on said standards, a water receiving tub supported on the inner ends of the levers, a flexible element secured to the outer ends of the levers, guide sheaves for the flexible elements, a stem for the valve of the water conducting pipe around which the lower portion of the flexible element is wound and the central portion of the flexible element providing a loop, a lever pivoted for slidable movement having one end connected with the loop and a coil spring connected with the second end of the last mentioned lever and influencing the same toward one of the standards.

2. In a watering trough, a water conducting pipe having its passage controlled by a valve and having an angle branch merging into a goose neck outlet, fixed standards, centrally pivoted levers on said standards, a water receiving tub supported on the inner ends of the levers, a flexible element secured to the outer ends of the levers, guide sheaves for the flexible elements, a stem for the valve of the water conducting pipe around which the lower portion of the flexible element is wound and the central portion of the flexible element providing a loop, a lever pivoted for slidable movement having one end connected with the loop and a coil spring connected with the second end of the last mentioned lever and influencing the same toward one of the standards, and means for adjusting the tension of the springs.

3. In a watering trough, a water conducting pipe having its passage controlled by a valve and having an angle branch merging into a goose neck outlet, fixed standards, centrally pivoted levers on said standards, a water receiving tub supported on the inner ends of the levers, a flexible element secured to the outer ends of the levers, guide sheaves for the flexible elements, a stem for the valve of the water conducting pipe around which the lower portion of the flexible element is wound and the central portion of the flexible element providing a loop, a lever pivoted for slidable movement having one end connected with the loop and a coil spring connected with the second end of the last mentioned lever and influencing the same toward one of the standards, and means for adjusting the tension of the springs, and a tubular guide for the stem of the valve.

4. In a watering trough, a water conducting pipe having its passage controlled by a valve and having an angle branch merging into a goose neck outlet, fixed standards, centrally pivoted levers on said standards, flexible elements secured to the inner ends of said levers, a ring to which said elements are secured, a water receiving tub removably arranged in the ring, a flexible element secured to the outer ends of the levers, guide sheaves for the flexible elements, a stem for the valve of the water conducting pipe around which the lower portion of the flexible element is wound and the central portion of the flexible element providing a loop, a lever pivoted for slidable movement having one end connected with the loop and a coil spring connected with the second end of the last mentioned lever and influencing the same toward one of the standards.

In testimony whereof I affix my signature.

FRANKLIN NOAH GUYMON.